United States Patent [19]
Kuts

[11] 3,784,431
[45] Jan. 8, 1974

[54] MANUFACTURE OF WINDSHIELD WIPER BLADES

[75] Inventor: Mathew Kuts, Akron, Ohio

[73] Assignee: The B. F. Goodrich Company, New York, N.Y.

[22] Filed: June 26, 1972

[21] Appl. No.: 266,149

Related U.S. Application Data

[62] Division of Ser. No. 135,092, April 19, 1971, Pat. No. 3,697,356.

[52] U.S. Cl. ............... 156/201, 15/250.36, 156/202, 156/216
[51] Int. Cl. .............................................. B31f 7/00
[58] Field of Search .................. 15/250.36, 250.41, 15/250.42, 245, 256.50, 250.10, 250.20; 156/200, 201, 202, 203, 216, 459–460, 461, 463–468

[56] References Cited
UNITED STATES PATENTS

| | | | |
|---|---|---|---|
| 1,545,815 | 7/1925 | Dirkson et al. | 156/403 |
| 1,686,466 | 10/1928 | Putt | 156/460 |
| 2,696,865 | 12/1954 | Oeiler | 161/107 X |
| 2,732,882 | 1/1956 | Kuts | 156/467 X |

Primary Examiner—Alfred L. Leavitt
Assistant Examiner—David A. Simmons
Attorney—Joseph Januszkiewicz et al.

[57] ABSTRACT

The method of making a distendable stationary window wiper blade which is suitable for cleaning a movable window as in station wagons. The blade is distendable by fluid pressure to simultaneously press the wiper blade against the window and spray liquid against the window to provide means for lubricating and wetting the window. Such wiper blade is made by encasing a tube with fabric reinforced material, folding such fabric material over the tube to cover such tube completely, adhering a thin bead along the central length thereof and cutting such blade into predetermined lengths.

5 Claims, 8 Drawing Figures

PATENTED JAN 8 1974 3,784,431
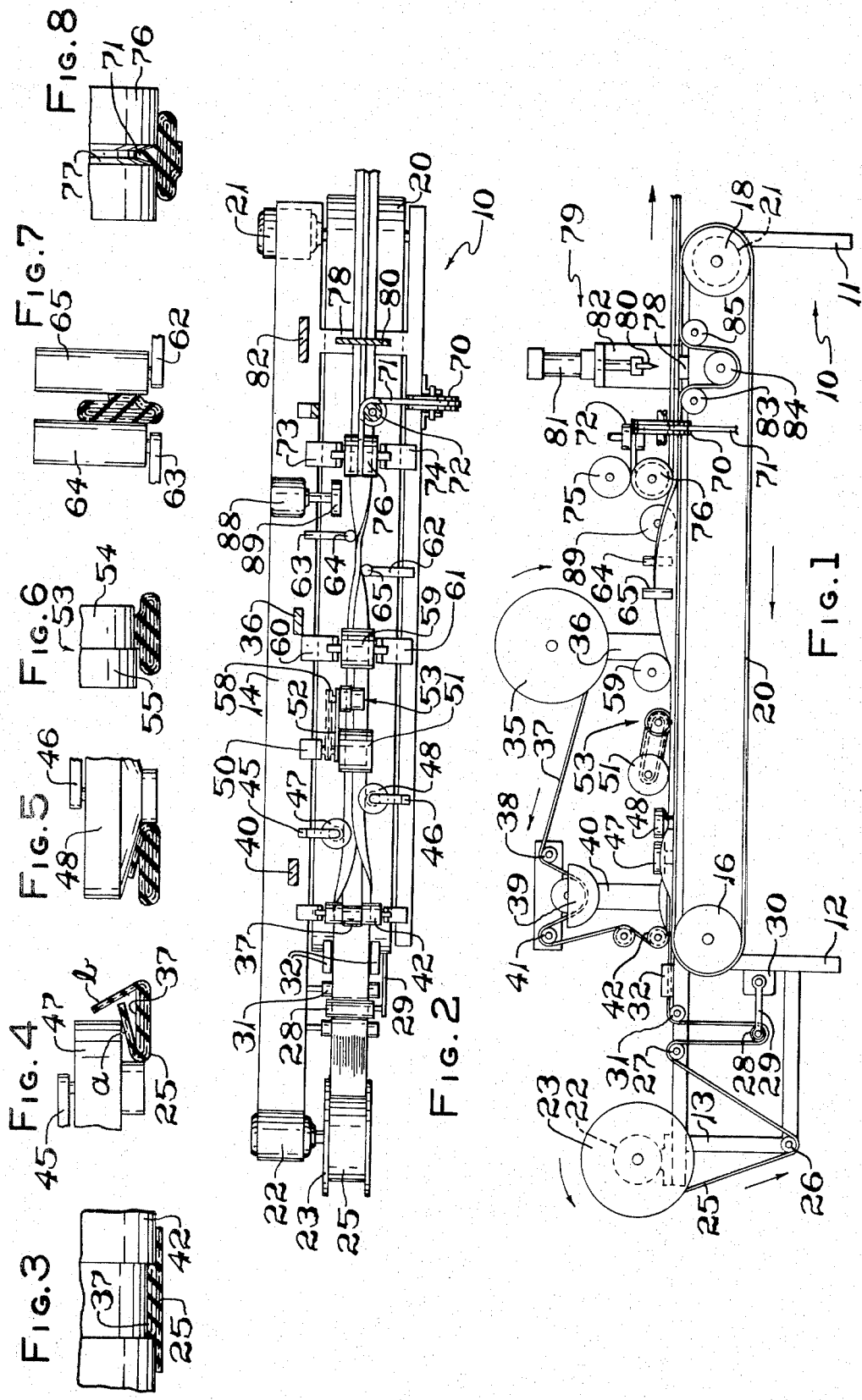

MANUFACTURE OF WINDSHIELD WIPER BLADES

CROSS REFERENCE TO RELATED APPLICATIONS

This application is a division of co-pending application Ser. No. 135,092 filed Apr. 19, 1971, now U.S. Pat. No. 3,697,356.

BACKGROUND OF THE INVENTION

This invention relates to a method for making distendable blades which blades are distendable upon actuation and simultaneously dispense fluids against a movable window to facilitate the cleaning thereof. This type of wiper blade is particularly useful for cleaning power operated windows in a motor vehicle such as the remotely operated rear window of a station wagon.

Prior to this invention wiper blade assemblies have consisted primarily of a wiper blade supported by mechanical spring mechanisms which bias the wiper blade against the associated window. The spring mechanisms have been leaf springs essentially similar to the form of supports commonly used on power operated oscillating wipers for automobile windshields.

Such prior art wiper blade assemblies are not adaptable as a practical matter for use on the rear windows of station wagons due to the problem of remoteness of power, complex controls and the fact that wiping area of the oscillating wiper blade is unsatisfactory because its pattern of cleaning is a sector of a circle and not acceptable when such wiper blades are used on large rectangular shaped windows as in the large rear window of a station wagon.

SUMMARY OF THE INVENTION

The wiper blade of this invention provides for the selective engagement and disengagement of a wiper bead from an adjacently located window through the use of a simple fluid pressure system. Preferably, liquid pressure is used to position the wiper blade so that as the blade is positioned, the fluid medium is dispensed against the window that is to be cleaned. Such spraying liquid medium on the window is done simultaneously with the engagement of the wiper bead with the window. That is the washing and the wiping function are provided in a single integral assembly. The present invention provides the novel means and apparatus for making such wiper blade. Heretofore, the fabrication of such blades were a hand operation confined to manipulating the various elastomeric stock by hand.

The method of this invention provides for a simplified means for constructing a unitary wiper blade in an economical manner which eliminates hand operations.

DESCRIPTION OF THE DRAWINGS

FIG. 1 is a schematic side elevational view of the apparatus for fabricating a window wiper blade.

FIG. 2 is a schematic plan view of the apparatus for fabricating a window wiper blade.

FIG. 3 is a fragmentary cross sectional view of a tube and rubberized fabric being pressed into position.

FIG. 4 is a fragmentary cross sectional view of the rubberized fabric having its one edge folded onto the tube by roller means.

FIG. 5 is a fragmentary cross sectional view of the rubberized fabric having its second edge folded onto the tube.

FIG. 6 is a fragmentary cross sectional view of the rubberized fabric being firmly pressed into engagement.

FIG. 7 is a fragmentary cross sectional view of the fabricated wiper blade being turned over.

FIG. 8 is a fragmentary cross sectional view of the fabricated wiper blade having a bead pressed into engagement with the body portion of the wiper blade.

Referring to the drawings wherein like reference characters designate like or corresponding parts throughout the several views, there is shown in FIG. 1 a supporting structure or support means designated generally by the reference character 10. Support means 10 includes a plurality of vertical supports 11, 12 and 13 with suitable cross braces including horizontally extending support 14 (FIG. 2). Mounted on support means 10 are a pair of spaced pulleys 16 and 18 upon which is trained an endless belt 20 to present an upper conveying run and a lower return run. The conveying run of endless belt 20 adjacent to pulley 16 is the receiving end while the conveying run of belt 20 adjacent to pulley 18 is the discharge end. Pulley 18 is driven by a motor drive unit 21 mounted on horizontally extending support 14. Suitably mounted on the other end of support 14 is a motor drive unit 22 which drives a supply means or reel 23. Reel 23 has a supply of fabric reinforced elastomeric material or tape 25 wound thereon. Energization of motor drive unit 22 unwinds the tape 25 for passage under idler roller 26 and over roller 27 for passage under a dancer roller 28. A separate roll not shown may be used to wind up the liner that is used with tape 25 to prevent it from sticking to the other portions of the tape on reel 23. Dancer 28 is guided for vertical movement in suitable guide means not shown such that the position of a lever arm 29 connected to dancer roll 28 is operative to control the energization and de-energization of motor 22. One end of a lever 29 is operative to actuate a plurality of limit switches in housing 30 to control such motor 22. The operation of motor 22 controls the rotation of reel 23 in such a manner that it maintains a suitable supply of tape 25 in an untensioned condition for passage onto the receiving end of endless belt 20. Tape 25 upon movement from dancer roll 28 is directed upwardly over idler roll 31 and thence through a pair of spaced guides 32, 32 for movement onto conveyor 20. A supply means or supply reel 35 is suitably mounted on a bracket 36 which reel 35 supplies an elastomeric tube 37 which passes over idler roller 38 for passage onto a tank 39 mounted on a T-shaped support 40. Tank 39 contains a cement solution which coats the exterior of the tube 37 as it passes therethrough. T-shaped support 40 contains a second idler roller 41 which directs the passage of tube 37 over idler roller 38, thence into tank 39 for subsequent movement over idler roller 41 and thence in a direction downwardly towards a grooved roller 42 which is suitably journaled on support means 10 immediately above pulley 16, the width of the groove in roller 42 is substantially the same as that of the tube 37, which is shown in FIG. 3 and permits the guiding of the tube 37 downwardly into position on the moving tape 25. Mounted on the support means 10 are a pair of brackets 45 and 46 which suitably support folding means such as turn-up rolls 47 and 48, which rolls 47 and 48 are in staggered relationship to facilitate the turning up of the respective side edges of the tape 25 as more clearly shown in FIGS. 4 and 5. The side edge "a" of tape 25 is turned over in advance of the size edge "b" to facilitate the encasement of the tube 37 by the tape 25. Mounted on the intermediate portion of horizontal support 14 is a bracket 50 which journals for rotation a roller 51. Roller 51 is in rolling engagement with the upper portion of the tape 25. Suitably journaled on the same axle that supports roller 51 is a bracket 52 whose outboard end supports for rotation a roller 53, which roller 53 has a reduced end portion 54 and an enlarged portion 55. The diameter of the reduced portion 54 is such that it maintains a firm contact with the side edge of the tape 25 "b" as seen more clearly in FIG. 6. A chain 58 interconnects the axle which supports roller 53 and the axle which supports roller 51 such that the rotation of 51 drives chain 58 and the roller 53. Since the diameter of roller 53 is less than that of roller 51, the peripheral speed of roller 53 is substantially greater than that of roller 51 which thereby performs a thorough stitching action on the tape 25. Roller 51 and 53 together perform the stitching operation. A second stitching roller 59 is located adjacent to roller 53, suitably journaled on a pair of brackets 60 and 61.

Encased tube 37 along with the fabric reinforced tape 25 form the wiper core of the wiper blade. Mounted on support means 10 are a pair of brackets 62 and 63 which support for rotation idler rollers 64 and 65 whose function is to turn over the core body, or the encased tube 37 along with tape 25, to present upwardly the tape 25 without a spliced section for a purpose to be described.

Mounted on one side edge of support means 10 is a grooved roller 70 which is operative to guide bead 71 from a suitable supply source to an idler roller 72 whose axis extends in a vertical direction such that the bead 71 is trained around such pulley 72. Bracket 73 and 74 mounted adjacent to idler roller 72 support for rotation a pair of vertically disposed rollers 75 and 76 wherein roller 76 is grooved centrally therein as at 77 as shown in FIG. 8 to accommodate the passage of the bead 71, such that the rotation of roller 76 deposits the bead 71 onto the upper surface of tape 25. Roller 76 also performs the function of adhering such bead to the tape 25. An anvil 78 is mounted in alignment with the upper conveying run of endless belt 20 for cooperation with a pneumatically operated cutting means 79 to sever the wiper blade being fabricated in a manner to be described. Cutting means 79 consists of a cutting blade 80 that is suitably mounted on the rod end of a pneumatic cylinder 81, which cylinder 81 is mounted on a bracket 82. The upper conveying run of endless belt 20 is trained about an idler pulley 83 for movement down and around a lower idler pulley 84 and thence over an idler pulley 85 to bypass the anvil 78. A counting device 88 is mounted on support 14 such that its outer rolling element 89 is in contact with the conveying belt 20 to precisely measure the length of fabric passing thereunder and being operative to energize pneumatic cylinder 81 upon a predetermined length of belt passing thereunder for the cutting operation to provide a predetermined length of wiper blade. Such blades are then vulcanized in a manner well known in the art.

In the operation of the fabricating apparatus, reel 35 supplies the tube 37 which passes through tank 39 which coats the exterior surface of the tube with cement, after which such tube 37 passes downwardly towards the receiving end of the endless belt 20. Simultaneously with such action reel 23 supplies the tape 25, which tape 25 is directed by guide means 32 to the receiving end of the endless belt 20. The cement covered tube 37 is deposited on the tape 25 and is pressed firmly thereto through the action of the roller 42. The tape 25 travels along with the conveying run of belt 20. Thereafter the respective side edges of the tape are folded over the tube 37 through the action of the turn-up rollers 47 and 48 such that the tube is encased within the tape. Stitching rollers 51, 53 and 59 stitch the tape to the tube. Thereafter rollers 64 and 65 turn the encased tube completely over in preparation for having the bead 71 centered and placed centrally thereon. The encased tube along with bead 71 forms a wiper blade of continuous length which is cut into predetermined lengths by the cutting means 79 as controlled by the counting device 88 which counting device can be pre-set to provide for any length of cut desired. The cut tube is then vulcanized in a manner well known in the art and then provided with a plurality of holes that lie closely adjacent to the bead 71 communicating the central passageway in tube 37 with the exterior thereof.

I claim:

1. The method of making wiper blades comprising the steps of conveying a continuous length of elongated fabric reinforced tape in a longitudinal direction onto the receiving end of a conveyor means for movement therewith; conveying a continuous length of an elongated flat tube for positioning onto said moving tape at the receiving end of the conveyor means with the longitudinal center line of said tube being in alignment with the center line of said fabric tape, folding the respective side edges of said fabric tape over said tube to encase said tube; stitching said continuously moving tube and tape into firm adhesion to each other to form a wiper core; directing a bead onto the center line of said wiper core to form a continuous wiper blade; and cutting the wiper core into predetermined lengths to form a wiper blade.

2. A method for making wiper blades as set forth in claim 1 wherein said stitching means is done by rotating wheels into contact with said tube and tape wherein one of said rotating wheels is driven at a faster speed than the remaining rotating wheels to provide a firm adhesion of the overlapping tape to said tube.

3. A method of making a wiper blade comprising the steps of adhering a longitudinally extending tube centrally to an elongated strip of fabric reinforced elastomeric material, folding said fabric material over said tube to cover the tube completely with said fabric reinforced material, adhering a thin elongated bead to said fabric reinforced material to form a continuous length wiper blade, cutting said continuous length wiper blade into wiper blades of predetermined length, and vulcanizing said wiper blades.

4. The method of making a wiper blade as set forth in claim 3 curing said fabric reinforced material with bead thereon.

5. A method of making a wiper blade comprising the steps of feeding a continuous fabric reinforced tape of elastomeric material in a longitudinal direction; coating the exterior of an elastomeric tube of continuous length with cement; feeding said coated elastomeric tube onto said tape for longitudinal alignment thereon; folding said tape over to encase said tube; feeding a continuous length of bead onto said tape to form a wiper blade of continuous length; cutting said continuous length of wiper blade tube into predetermined lengths; and vulcanizing said wiper blades.

* * * * *